April 20, 1943. P. S. VAUGHAN 2,317,090
TORSIONAL VIBRATION DAMPER
Filed Dec. 11, 1941
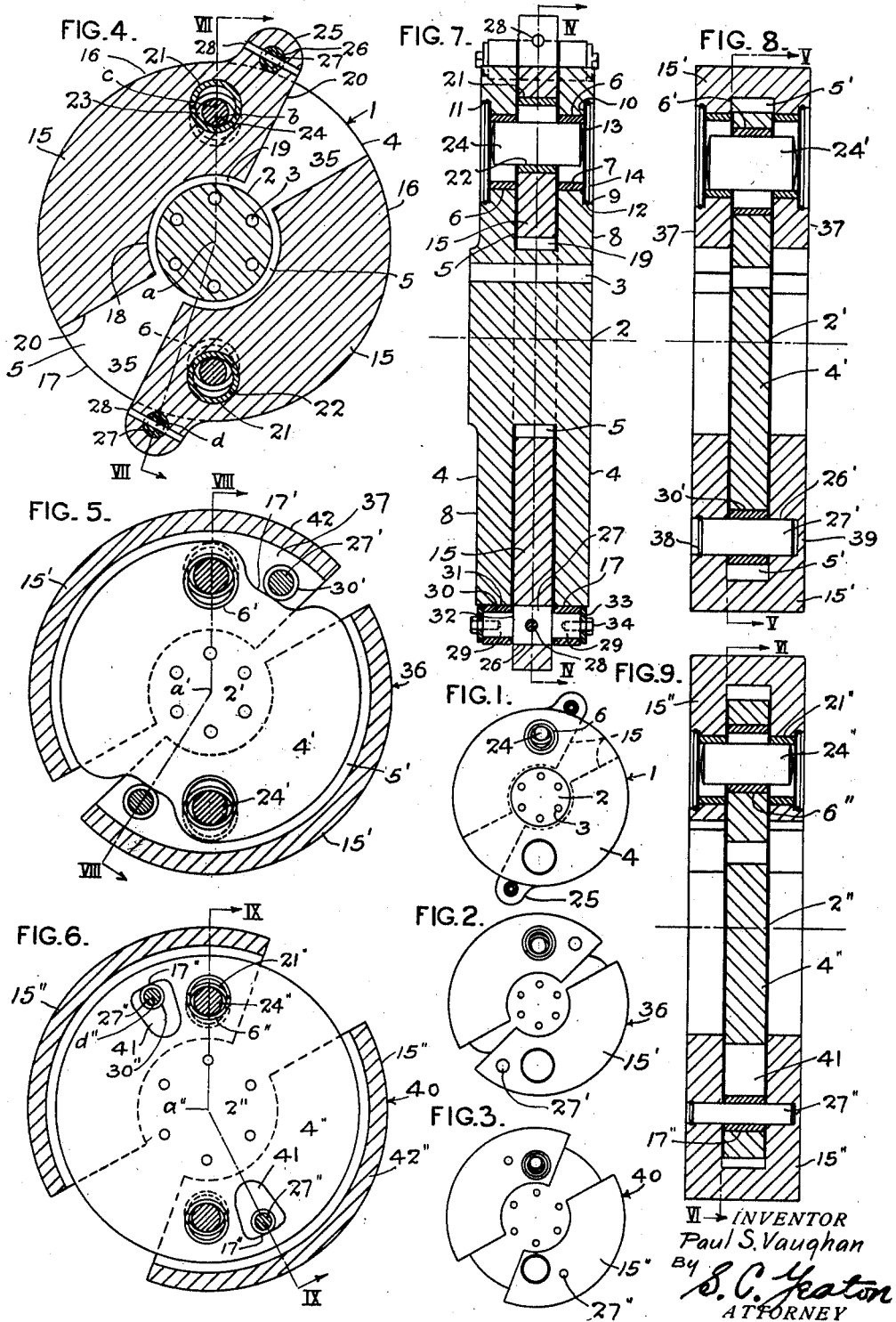
INVENTOR
Paul S. Vaughan
BY S. C. Yeaton
ATTORNEY Patented Apr. 20, 1943

2,317,090

UNITED STATES PATENT OFFICE 2,317,090

TORSIONAL VIBRATION DAMPER

Paul S. Vaughan, Auburn, N. Y., assignor to American Locomotive Company, New York, N. Y., a corporation of New York Application December 11, 1941, Serial No. 422,493

7 Claims. (Cl. 74—574)

This invention relates to torsional vibration dampers.

An object of the present invention is to provide improved and simpler torsional vibration dampers of the type known as polyharmonic dampers.

Other and further objects of this invention will appear from the following description, the accompanying drawing and the appended claims.

Referring to the drawing forming a part of this application, Figures 1, 2 and 3 are side elevations of three structurally different dampers embodying the present invention, parts being removed; Figs. 4, 5 and 6 are enlarged sections respectively of the dampers of Figs. 1, 2 and 3, taken respectively on the lines IV—IV of Fig. 7, V—V of Fig. 8 and VI—VI of Fig. 9; and Figs. 7, 8 and 9 are further enlarged sections taken respectively on the lines VII—VII of Fig. 4, VIII—VIII of Fig. 5, and IX—IX of Fig. 6, parts being shown in full.

Referring first to Figs. 1, 4 and 7, in which is illustrated one embodiment of the present invention, the damper is indicated generally by the reference numeral 1. It includes a shaft 2 having an axis $a$, which shaft may be considered as an extension or part of the shaft (not shown), the vibrations of which the damper is intended to dampen, and it may be secured thereto by bolts (not shown) passing through orifices 3 formed in the shaft 2 for this purpose. The damper (as well as the dampers of the embodiments of Figs. 2 and 3) has a wide field of adaptations, but it is especially designed for use with an internal combustion engine, for instance a high power aircraft engine or a high power Diesel engine.

Two annular spiders or webs 4 are secured to and extend radially from the shaft 2, in the present instance the webs being integral with the shaft 2. The portion interiorly of the webs is considered for convenience as the shaft and this will apply also to the embodiments of Figs. 2 and 3. Obviously instead of this portion designated as a shaft, an orifice could be provided for mounting the damper on a shaft instead of bolting it thereto. Each web is in configuration, a flat annular plate and they are spaced axially from each other, providing an annular recess 5 extending completely around the shaft 2.

Each web has two orifices 6, disposed on the same diameter of the damper, one at each side of the shaft 2, correlated orifices of the webs being in alignment axially of the shaft 2 so that the correlated orifices each have the same axis $b$. Bushings 7 are disposed in the orifices 6, providing a wear surface for a purpose presently to appear.

The outer face 8 of each web adjacent each orifice 6 thereof has a recess 9 providing a shoulder 10 extending transversely of orifice 6 and a side wall 11 disposed at right angles to the shoulder 10, the side wall 11 being provided with an annular groove 12. A flat plate 13 is disposed in recess 9 in engagement with shoulder 10 and it is retained by a split ring 14 disposed in groove 12, plate 13 closing orifice 6 at its outer end for a purpose presently to appear.

The damper 1 further includes two so-called restoring levers 15, which are similar and therefore but one will be described. The restoring lever 15 is flat and plate-like, and in configuration consists of a portion or segment, less than half, of an annulus. It is disposed in the recess 5, and in normal position its outer circumferential edge 16 coincides with the circumferential edges 17 of the webs. The inner edge 18 of the lever is circular, and of slightly longer radius than the shaft 2, providing an annular space 19 between the restoring lever and the shaft. The end edges 20 of the lever are radial from the axis $a$.

The restoring lever has an orifice 21 substantially the same size as the orifices 6, and a bushing 22, similar to bushing 7 is disposed in the lever orifice. The axis $c$ of orifice 21 is disposed radially of the shaft in line with axis $b$, but at a greater distance from axis $a$ than is axis $b$. Thus orifice 21 may be said to be offset from but overlapping its correlated orifices 6, providing a clear space 23 through the three orifices.

A rocker roller 24 is disposed in space 23, and the diameter of the roller coincides with the width of the space 23, taken radially of the shaft, so that the roller engages the inner side radially of orifice 21 and the outer sides radially of orifices 6. Roller 24 is rounded at its ends and its length is such that the ends just clear the plates 13, the roller being maintained in the orifices 6 and 21 by the plates 13.

For the purposes of further description, and in the appended claims, the bushings 7 and 22 will be disregarded and the roller will be described as engaging the walls of the orifices. The use of the bushings is optional and when employed their orifices are considered the equivalent of the orifices with which they engage.

Orifice 21 is adjacent one end of the restoring lever 15, that is to say adjacent one end of the segment forming the lever, so that the largest mass of the lever is on one side of the roller 24. On the other side of roller 24 a lug 25 extends outwardly from the outer edge 16 of the lever. An orifice 26 is formed in the lug, and a fulcrum pin 27 is disposed in the orifice and secured therein by a key 28. The pin has extensions 29 (see lower lever 15, Fig. 7), overlapping each of the webs 4, the extensions being of a smaller diameter than the portion of the pin disposed in orifice 26. A fulcrum bushing or roller 30 is rotatably mounted on each extension, with its outer face 31 in rolling engagement with the outer edge 17 of the adjacent web. Endwise displacement movement of the rollers 30 is prevented by shoulders 32 formed at the jointure of the extensions 29 with the portion of the pin disposed in orifice 26 and by a retaining washer 33 secured to the free end of each extension by a tap bolt 34.

As the pin 27 is disposed in the storing lever at the side of the orifice 21 of smaller mass, centrifugal force movement of the lever maintains the rollers 30 in engagement with the edges 17, and therefore the distance from the axis $a$ of the shaft to the axis of the pin 27, indicated by the letter $d$, is fixed. Similar remarks also apply to the embodiments of Figs. 2 and 3. Pin 27 therefore forms the fulcrum of the restoring lever for substantially radial movement, as will later more fully appear.

As each lever is in size less than half an annulus, keystone-shaped spaces 35 are provided between the opposite ends of the two levers. Spaces 35 and 19, in cooperation with the spaces provided in the orifices 6 and 21 between the walls of the orifices and rollers 24 permit rotary movements of the restoring levers circumferentially of the web 4, which will be hereinafter more fully set forth.

As the other two dampers shown on the drawing are modifications of damper 1, showing alternative structures of increased compactness, and as all three dampers are similar in operation and work according to the same principles, these other two dampers will be now described and the operation of the three dampers will be later described.

In damper 1 the restoring levers 15 are formed, as aforedescribed, each of a single flat plate disposed in the recess 5 between the spaced webs 4 carried by the shaft 2. The damper of Figs. 2, 5 and 8, indicated generally by the reference numeral 36, is a modification of the damper of Fig. 1 and similar parts will therefore be designated by similar reference numerals and letters with accents added.

The damper 36 is characterized by having a single web 4' carried by the shaft 2', the web 4' being disposed in recesses 5' provided between spaced plates 37 of the restoring levers 15'. The restoring levers 15' are secured to the web 4' similarly to the manner in which the restoring levers 15 are secured to the webs 4. However, there are two orifices in the restoring lever and one in the web for each rocker roller 24'.

Referring more particularly to Fig. 5, it will be seen that the damper 36 is not provided with the lug 25 of damper 1. Instead, web 4' is cut away adjacent each orifice 6' at the side thereof which corresponds to the side of orifice 6 adjacent pin 27. The cut-away portion has a circular edge 17' of uniform radius from axis $a'$ for coaction with a fulcrum bushing or roller 30'. Each fulcrum pin 27' is cylindrical in shape and is retained in the orifices 26' (one of which is more properly a socket) in its restoring lever by a split ring 38 at one end and at its other end it abuts a portion 39 of the restoring lever, as is clearly shown in Fig. 8.

By disposing pin 27' within the outermost circumferential edge of web 4', damper 36 is made more compact than damper 1, and can therefore be used where damper 1 would prove too large due to the lugs 25. As edge 17' is drawn from axis $a'$ as a center, similar to edges 17, the movement of the restoring levers 15' are similar to the movement of restoring levers 15.

In Figs. 3, 6 and 9 another modification of the invention is shown, the damper being indicated generally by the reference numeral 40. It is, in many respects, similar to damper 36 and therefore similar parts will be designated by similar reference letters and numerals with two accents added.

Damper 40 has a single web 4'' extending from its shaft 2''. The restoring levers 15'' in configuration are similar to the levers 15'. The rocker rollers 24'' engage the outer sides of orifices 21'' and the inner side of orifice 6''.

Damper 40 includes a fulcrum pin 27'' which is disposed on the opposite side of roller 24'' than the pin 27' is disposed in relation to the roller 24'. Therefore pin 27'' is urged radially outward by the restoring lever, as will presently appear, instead of radially inward as are the pins of dampers 1 and 36, and for this reason web 4'' is provided with an orifice 41 for each fulcrum bushing or roller 30'' of such shape and size as to permit proper rolling of roller 30'' on edge 17'', as is clearly shown in Fig. 6.

In damper 40, the center of gravity of a restoring lever is nearer to the lever fulcrum (axis $d''$) than in dampers 1 or 36. Thus damper 40 may be used in a case where the ratio of the distance between the restoring lever center of gravity and fulcrum to the distance between the axis of the restoring lever roller hole and fulcrum should be less than in dampers 1 and 36.

Dampers 1, 36 and 40 are three designs, all adapted to accomplish the same results, and many of their features are interchangeable in an obvious manner to provide other designs, all of which are contemplated as within the scope of the present invention. For instance, the three dampers each show a different disposition of the fulcrum pin (pins 27, 27' and 27''), but pin 27 may be used in damper 36 or 40, or pins 27' and 27'' may be used in damper 1, if desired. Also, because of the provision of two plates in the restoring levers 15' and 15'', each lever 15' is provided with a circumferential connecting wall 42, and each lever 15'' with a similar wall 42'', which walls 42 and 42'' shelter a portion of the web therein. Restoring lever 15 may, if desired, be provided in an obvious manner, with a wall comparable to wall 42, providing lateral circumferential flanges overlapping each side of the webs 4, for sheltering them.

The gas pressures which act upon the pistons of an internal combustion engine cause a torque on the crankshaft. This torque is not uniform, but varies over a wide range. The variation follows a regular pattern, which is repeated each time a cylinder fires. Thus the crankshaft tends to oscillate torsionally. Due to the torsional flexibility of the crankshaft, and to the masses of the moving parts of the engine and driven machinery, the torsional oscillation resulting from the irregular torque may occur at a natural frequency of the shaft system. When this condition prevails, the shaft system may build up large amplitudes of vibration, which may become injurious to the engine or driven machinery. It is the purpose of this invention to prevent excessive torsional vibration.

It is known to those skilled in the art that a mass may be flexibly attached to the shaft system, having characteristics which cause it to reduce or cancel the vibrations of the shaft. However, when the flexibility of the attachment has a constant value, the cancellation occurs only over a very narrow speed range, and this mass, so attached, therefore, does not provide a solution for those engines which operate over a wide range of speeds.

In the present invention, the flexibility of the attachment or connection is caused to change as the engine speed changes, in such a manner that the "tuning" is always correct, regardless of speed. This is accomplished by substituting centrifugal force for a mechanically flexible connection. A rotating mass is urged outward by centrifugal force, which force increases with speed. The mass is attached in a manner which permits it to oscillate about a fulcrum point, like a pendulum. These principles are not new. The present invention relates to the structurally novel manner in which the masses are attached.

The actions of all three of the embodiments described herein are similar. Referring to the first embodiment (Figs. 1, 4 and 7) as illustrative: When the point along the shaft to which the damper is attached undergoes a torsional oscillation, the rotation of the webs 4 is alternately accelerated and retarded. The mass of the restoring levers 15 tends to make them rotate at uniform speed. Thus, considering only one restoring lever, the aligned orifices 6 of the webs 4 tend to be displaced angularly with respect to orifice 21 of the restoring lever 15. The roller 24 is maintained in contact with these orifices 6 and 21 by centrifugal force acting to keep the restoring lever at the outermost radial position. It will be apparent that any angular displacement from the mean position will be accomplished by an inward radial movement of the restoring lever. Thus, any tendency of the shaft to oscillate torsionally is opposed by the torque which is required to cause an angular displacement of orifices 6 and 21, and the consequent inward movement of the restoring lever against the action of centrifugal force.

The orifice 21 of the restoring lever is located at a certain angular distance from the center of gravity. The rollers 30 on fulcrum pin 27 which passes through the restoring lever 15 roll on the circumferential track or edges 17—17 of the webs 4, and thus maintains this point (the axis of the fulcrum) at a fixed radial distance from the shaft center a. The centrifugal force of the restoring lever 15 is thus multiplied by the lever ratio of the distance from the center of gravity of the restoring lever 15 to the pin 27, and the distance from the roller 24 to the pin 27.

The restoring lever serves three purposes. First, it acts as a flywheel, tending to maintain uniform rotational speed. Second, it acts as a centrifugal pendulum mass, tending to move always away from the center of rotation. Third, it acts as a lever, transmitting the centrifugal force from its center of gravity through its fulcrum point at the pin 27, to the point of action at the roller 24.

The invention, as aforestated, resides in the simplified structural characteristics for accomplishing these three purposes.

While there have been hereinbefore described approved embodiments of this invention, it will be understood that many and various changes and modifications in form, arrangement of parts and details of construction thereof may be made without departing from the spirit of the invention and that all such changes and modifications as fall within the scope of the appended claims are contemplated as a part of this invention.

The invention claimed and desired to be secured by Letters Patent is:

1. A device for reducing torsional vibrations in a rotating shaft comprising a member adapted to be carried by said shaft for rotation therewith, with its axis of rotation in line with the axis of said shaft, said member having a curved portion of fixed radius from its said axis; a lever-like member serving as a weight associated with said carried member to rotate therewith; an element carried by said lever-like member in engagement with said curved portion for movement therealong, said engagement providing a fulcrum for said lever-like member for limited rotation thereabout, each of said members being provided with a curved surface of variable distance from said axis of rotation and having its center line parallel to said axis of rotation, said curved surfaces being curved in directions opposite to each other and disposed to provide a space therebetween; and a roller disposed in said space and engaging said curved surfaces, said roller being of a sharper curvature than said curved surfaces, said roller and fulcrum being located on the same side of and spaced from the center of gravity of said lever-like member.

2. In a device for reducing torsional vibrations in a rotating shaft, a member adapted to be carried by said shaft for rotation therewith, with its axis of rotation in line with the axis of said shaft, said member having a curved surface of variable distance from its said axis and having a curved portion of fixed radius from its said axis; a weight having a curved surface of variable distance from said member axis and oppositely directed to and disposed relative to said member curved surface to provide a space therebetween; and a roller disposed in said space in engagement with said curved surfaces, said roller being of a sharper curvature than said curved surfaces, said weight having a fulcrum, for limited rotation thereabout, in engagement with said member curved portion for movement therealong, said fulcrum and weight curved surface being on the same side of and spaced from the center of gravity of said weight.

3. In a device for reducing torsional vibrations in a rotating shaft, a member adapted to be carried by said shaft for rotation therewith, with its axis of rotation in line with the axis of said shaft, said member having an orifice providing a curved surface of variable distance from its said axis and having a curved portion of fixed radius from its said axis; a weight having an orifice overlapping said member orifice, providing a curved surface of variable distance from said member axis and oppositely directed to said member curved surface; and a roller disposed in said orifices in engagement with said curved surfaces, said roller being of smaller radius than said curved surfaces, said weight having a fulcrum, for limited rotation thereabout, in engagement with said member curved portion for movement therealong, said fulcrum and weight orifice being on the same side of and spaced from the center of gravity of said weight.

4. A torsional vibration damper for a rotatable shaft comprising a member adapted for association with said shaft to rotate therewith, with its axis of rotation in line with the axis of said shaft, said member having a curved portion of fixed radius from its said axis and an orifice; a restoring lever having, on the same side of and spaced from its center of gravity, a fulcrum, for limited rotation thereabout, engageable with said curved portion for movement therealong, and an orifice overlapping said member orifice; and a roller disposed in said orifices and connecting said lever to said member, said roller being of smaller radius than said orifices, permitting independent limited rotary movement of said lever about said axis of said member relative to said member by torsional vibration oscillations of said shaft, said roller further permitting limited movement of said lever throughout the portion thereof on the center of gravity side of said roller and fulcrum radially toward said axis of said member, said roller so engaging said orifices that said radial and said limited rotary movements of said lever act, during said torsional vibration oscillations, to draw said lever portion radially inward toward said axis of said member contrary to the centrifugal force exerted on said lever by shaft rotation, thereby damping said oscillations.

5. In a device for reducing torsional vibrations in a rotating shaft, a member adapted to be carried by said shaft for rotation therewith, with its axis of rotation in line with the axis of said shaft, said member including two axially spaced circular plates, each having an orifice providing a curved surface of variable distance from said axis of said member, and each having an outer circumferential curved portion of fixed radius from said axis of said member, said orifices being axially aligned and said curved portions being axially aligned; a weight disposed in the space between said plates, having an orifice overlapping said member orifices, providing a curved surface of variable distance from said axis of said member and oppositely directed to said member curved surfaces; and a roller disposed in said orifices in engagement with said curved surfaces, said weight having a fulcrum, for limited rotation thereabout, in engagement with said member curved portions for movement therealong, said fulcrum and weight orifice being on the same side of and spaced from the center of gravity of said weight, said weight orifice being between said center of gravity and said fulcrum.

6. In a device for reducing torsional vibrations in a rotating shaft, a member adapted to be carried by said shaft for rotation therewith, with its axis of rotation in line with the axis of said shaft, said member having an orifice providing a curved surface of variable distance from its said axis and an outer circumferential surface having a curved portion of fixed radius from its said axis disposed closer to its said axis than the adjacent portions of said circumferential surface; a weight including two axially spaced plates and an outer circumferential wall connecting said plates, said weight being disposed over said member with a plate adjacent each axial side thereof and its wall adjacent said circumferential surface, each of said plates having an orifice overlapping said member orifice, providing a curved surface of variable distance from said member axis and oppositely directed to said member curved surface, said plate curved surfaces being axially aligned, said weight further having a fulcrum, for limited rotation thereabout, disposed inwardly of said wall in engagement with said member curved portion for movement therealong, said fulcrum and weight orifices being on the same side of the center of and spaced from gravity of said weight, said weight orifices being between said center of gravity and said fulcrum; and a roller disposed in said orifices in engagement with said curved surfaces, said roller being of smaller radius than said curved surfaces.

7. In a device for reducing torsional vibrations in a rotating shaft, a member adapted to be carried by said shaft for rotation therewith, with its axis of rotation in line with the axis of said shaft, said member having an outer circumferential surface, an orifice providing a curved surface of variable distance from its said axis and an opening providing a curved portion of fixed radius from its said axis; a weight including two axially spaced plates and an outer circumferential wall connecting said plates, said weight being disposed over said member with a plate adjacent each axial side thereof and its wall adjacent said circumferential surface, each of said plates having an orifice overlapping said member orifice, providing a curved surface of variable distance from said member axis and oppositely directed to said member curved surface, said plate curved surfaces being axially aligned, said weight further having a fulcrum, for limited rotation thereabout, disposed inwardly of said wall in engagement with said member curved portion for movement therealong, said fulcrum and said weight orifices being on the same side of and spaced from the center of gravity of said weight, said fulcrum being between said center of gravity and said weight orifices; and a roller disposed in said orifices in engagement with said curved surfaces, said roller being of smaller radius than said curved surfaces.

PAUL S. VAUGHAN.